(12) United States Patent
Brunet et al.

(10) Patent No.: US 9,274,656 B2
(45) Date of Patent: Mar. 1, 2016

(54) FAST SCANNING FOR MUTUAL CAPACITANCE SCREENS

(71) Applicants: Samuel Brunet, Isle of Wight (GB); Richard P. Collins, Hampshire (GB); Luben H. Hristov, Sofia (BG); Steinar Myren, Vikhammer (NO); Trond J. Pedersen, Trondheim (NO); Paul Stavely, Hampshire (GB)

(72) Inventors: Samuel Brunet, Isle of Wight (GB); Richard P. Collins, Hampshire (GB); Luben H. Hristov, Sofia (BG); Steinar Myren, Vikhammer (NO); Trond J. Pedersen, Trondheim (NO); Paul Stavely, Hampshire (GB)

(73) Assignee: Atmel Corporation, San Jose, CA (US)

( * ) Notice: Subject to any disclaimer, the term of this patent is extended or adjusted under 35 U.S.C. 154(b) by 57 days.

(21) Appl. No.: 13/929,307

(22) Filed: Jun. 27, 2013

(65) Prior Publication Data
US 2015/0002444 A1 Jan. 1, 2015

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ............................... G06F 3/044; G06F 3/0416
USPC ...................... 178/18.01–19.07; 345/173–178
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2007/0229468 A1* | 10/2007 | Peng et al. | 345/173 |
| 2009/0189867 A1* | 7/2009 | Krah et al. | 345/173 |
| 2009/0315854 A1 | 12/2009 | Matsuo | |
| 2010/0066692 A1* | 3/2010 | Noguchi et al. | 345/173 |
| 2012/0154324 A1* | 6/2012 | Wright et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO  WO 2012/129247  9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Michael Pervan
(74) *Attorney, Agent, or Firm* — Baker Botts L.L.P.

(57) ABSTRACT

In one embodiment, an apparatus for detecting a touch. The apparatus includes a touch sensor that includes a first plurality of electrode lines and a second plurality of electrode lines. The apparatus also includes a touch sensor controller coupled to the touch sensor. The touch sensor controller is operable to apply a respective voltage pulse simultaneously to each of the first plurality of electrode lines, measure a respective signal at each of the second plurality of electrode lines, and detect a touch based on the measurement of the respective signals.

18 Claims, 11 Drawing Sheets

FAST SCANNING FOR MUTUAL CAPACITANCE SCREENS

TECHNICAL FIELD

This disclosure generally relates to touch sensors, and more particularly to fast scanning touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch sensor controller may process the change in capacitance to determine the position of the change in capacitance on the touch screen.

DESCRIPTION OF EXAMPLE EMBODIMENTS

Figure 1:
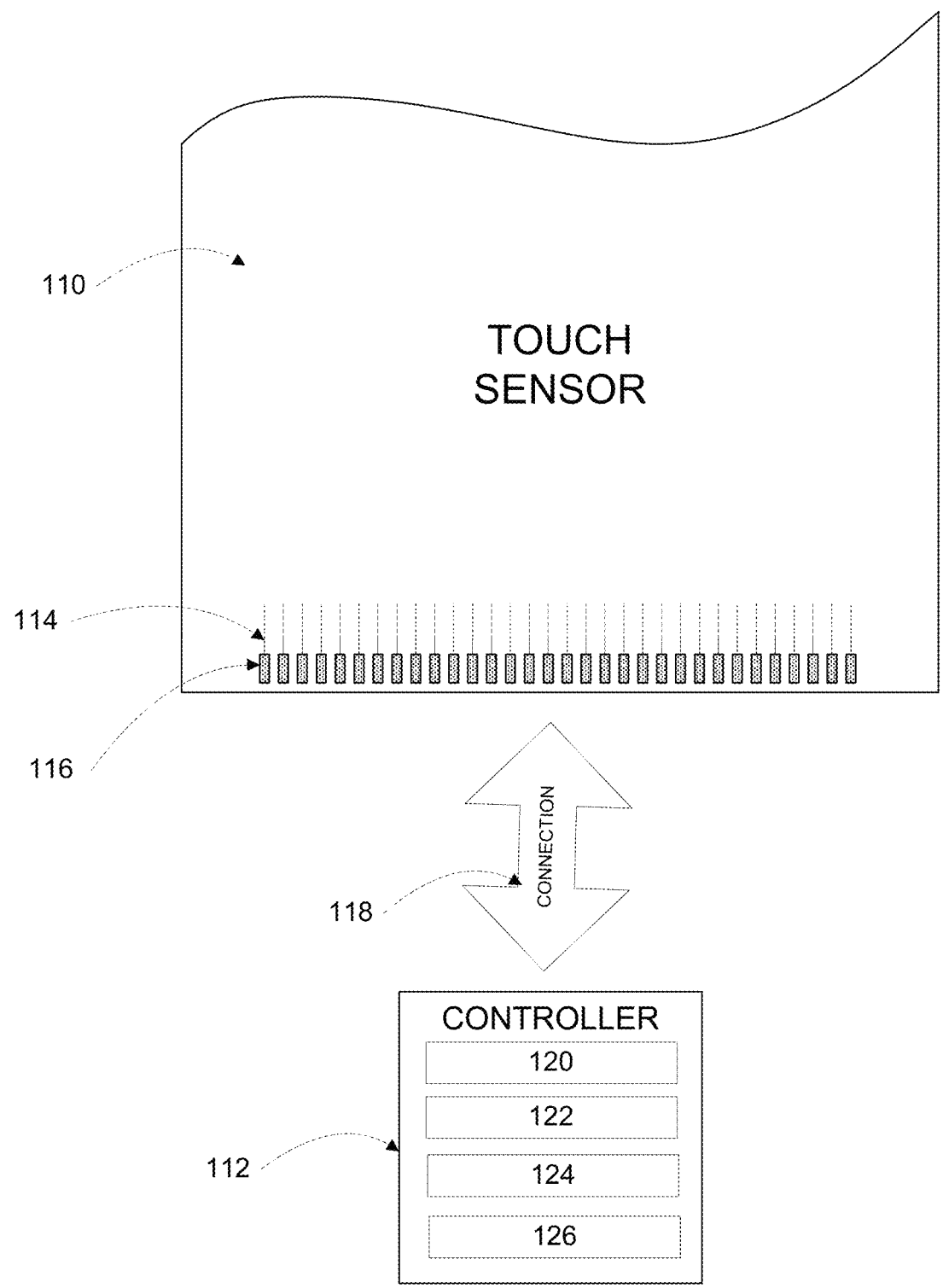
FIG. 1 illustrates an example touch sensor with an example touch-sensor controller, according to certain embodiments of the present disclosure.

A touch sensor may be arranged in rows and columns of electrode lines, with each row including a drive line and each column including a sense line. In that arrangement, capacitance may be measured by sequentially communicating an electrical pulse through each drive line and measuring the signal on each sense line. A variety of sequences of the order in which the drive lines are pulsed are possible. For example, the drive lines could be pulsed in a random order, or pulsed in an order based on the location of last detected touch. This method of measurement may generally be referred to as a mutual capacitance measurement. The goal of the mutual capacitance measurement is to provide the change in capacitance between a drive line and a sense line, which may indicate the presence and extent of a touch.

Generally, a majority of the time a touch screen is not touched at all. For example, when a video is displayed on a device the screen may be active for a long period of time, but no touches occur. Using mutual capacitance measurements all of the time therefore slows down the response time, because each drive line is pulsed sequentially, and increases power consumption beyond what is needed, because measuring a pulse from each drive line as it is pulsed sequentially consumes a significant amount of power. Power is consumed by pulsing a drive line and by taking a measurement from a sense line. Measuring a pulse from each drive line as it is pulsed sequentially consumes a significant amount of power because analog to digital conversion, calculations and processing must be performed for each measurement taken, so as more measurements are taken more power is consumed. Accordingly, aspects of the present disclosure include a method for speeding up scanning of the touch sensor and reducing power consumption by pulsing all drive lines simultaneously and measuring all sense lines simultaneously. This allows for faster response, because a touch can be detected without the wait for all of the drive lines to be sequentially pulsed, and less power consumption, because fewer measurements need to be taken on each sense line, as opposed to a set of measurements for each drive line pulsed sequentially. For example, if the drive lines are simultaneously pulsed twice, more power will be used pulsing the drive lines than if the drive lines are pulsed sequentially once, but less power will be used measuring the sense lines since only two measurements will be taken, as opposed to a measurement for each drive line if the drive lines are pulsed sequentially. However, driving all sense lines simultaneously may result in a large measured signal offset (as described in greater detail in conjunction with FIGS. 2a and 2b). Accordingly, aspects of the present disclosure include a method for reducing the measured signal offset when all drive lines are pulsed simultaneously. Further, eliminating the measured signal offset when all drive lines are pulsed simultaneously may result in locations on the touch sensor that are blind to a touch (blind spots) (as described in greater detail in conjunction with FIG. 3c). Accordingly, aspects of the present disclosure include a method for eliminating blind spots while reducing the measured signal offset when all drive lines are pulsed simultaneously. If a touch is detected the touch sensor may then be operated in mutual capacitance mode wherein each driving line is pulsed sequentially.

Figure 2A:
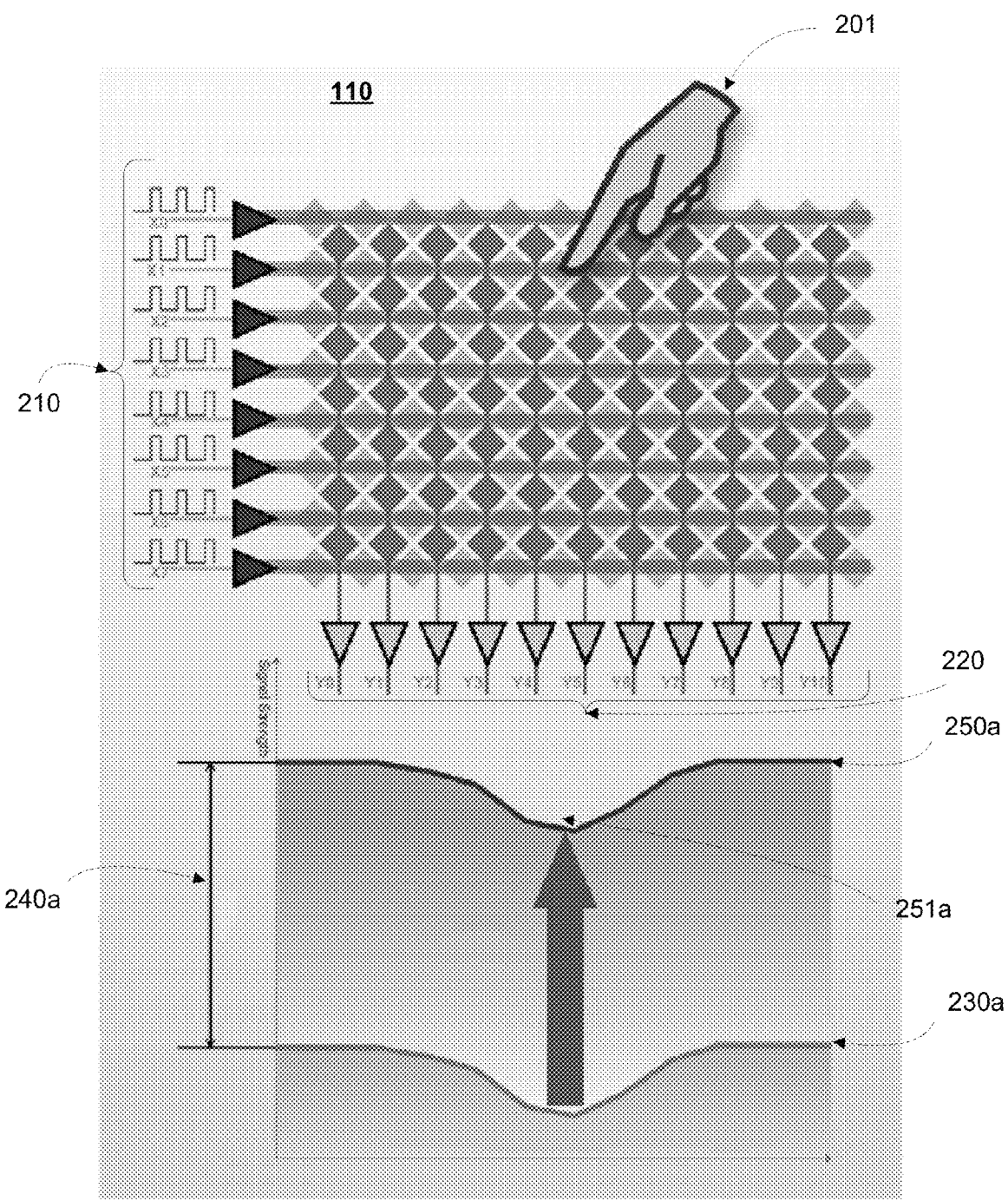
FIG. 2a illustrates an example touch sensor wherein all rows are pulsed simultaneously and all columns are measured simultaneously, according to certain embodiments of the present disclosure.
Figure 2B:
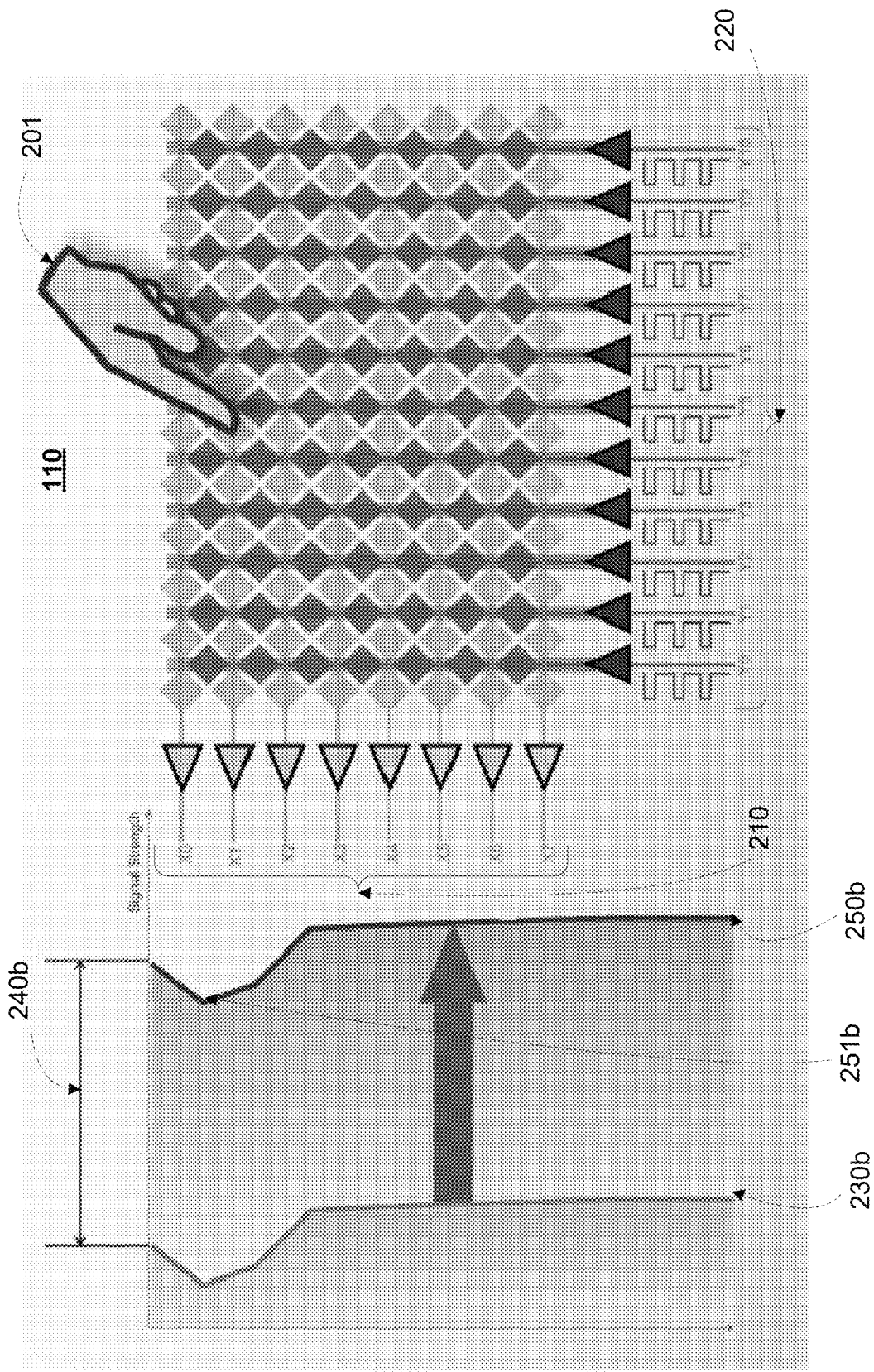
FIG. 2b illustrates the example touch sensor of FIG. 2a wherein the columns are pulsed simultaneously and all rows are measured simultaneously, according to certain embodiments of the present disclosure.
Figure 3A:
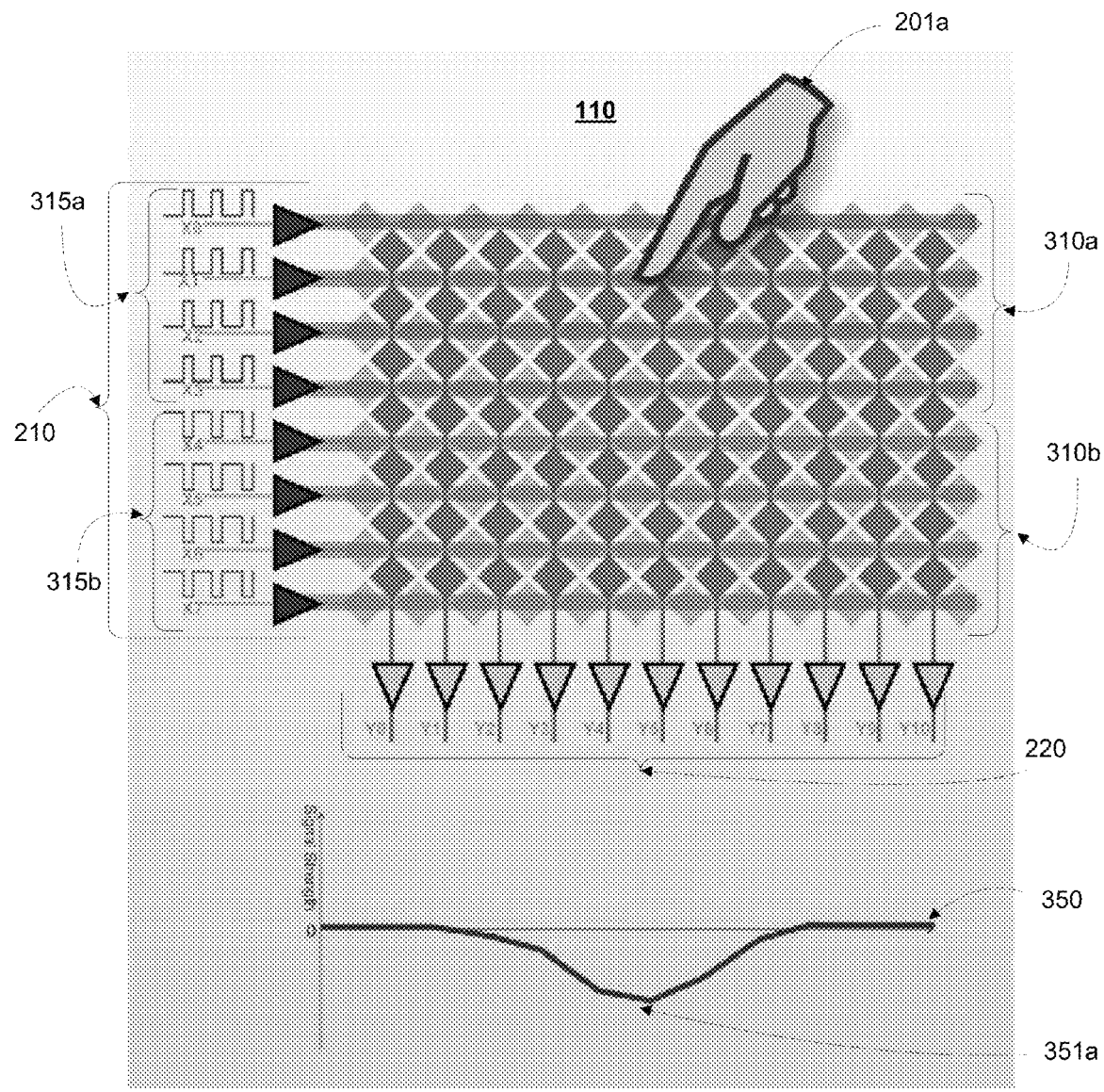
FIG. 3a illustrates an example touch sensor wherein all drive lines are pulsed simultaneously in such a way as to reduce the measured signal offset and a touch occurs on one half of the sensor, according to certain embodiments of the present disclosure.
Figure 3B:
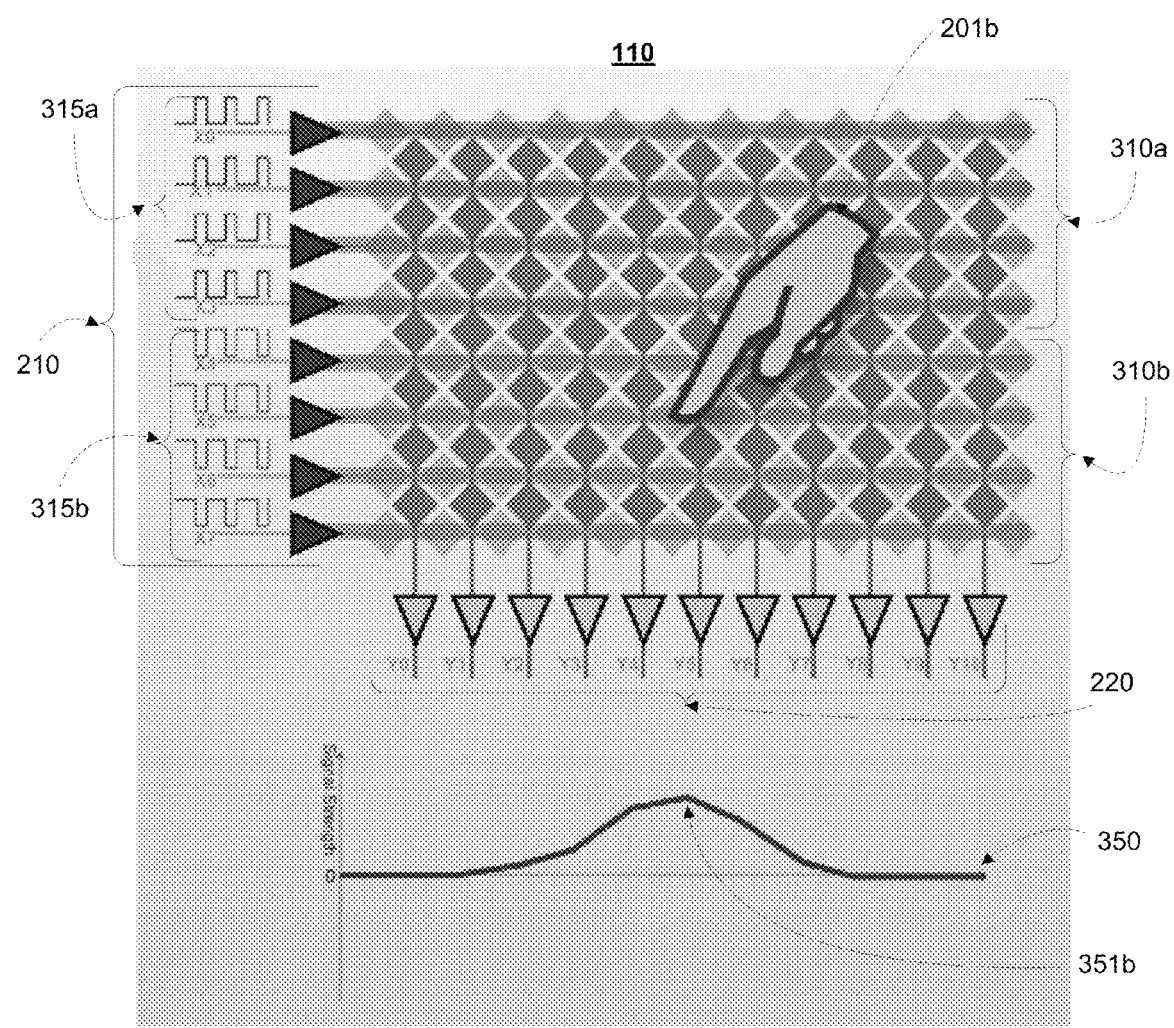
FIG. 3b illustrates the example touch sensor of FIG. 3a wherein a touch occurs on the other half of the sensor, according to certain embodiments of the present disclosure.
Figure 3C:
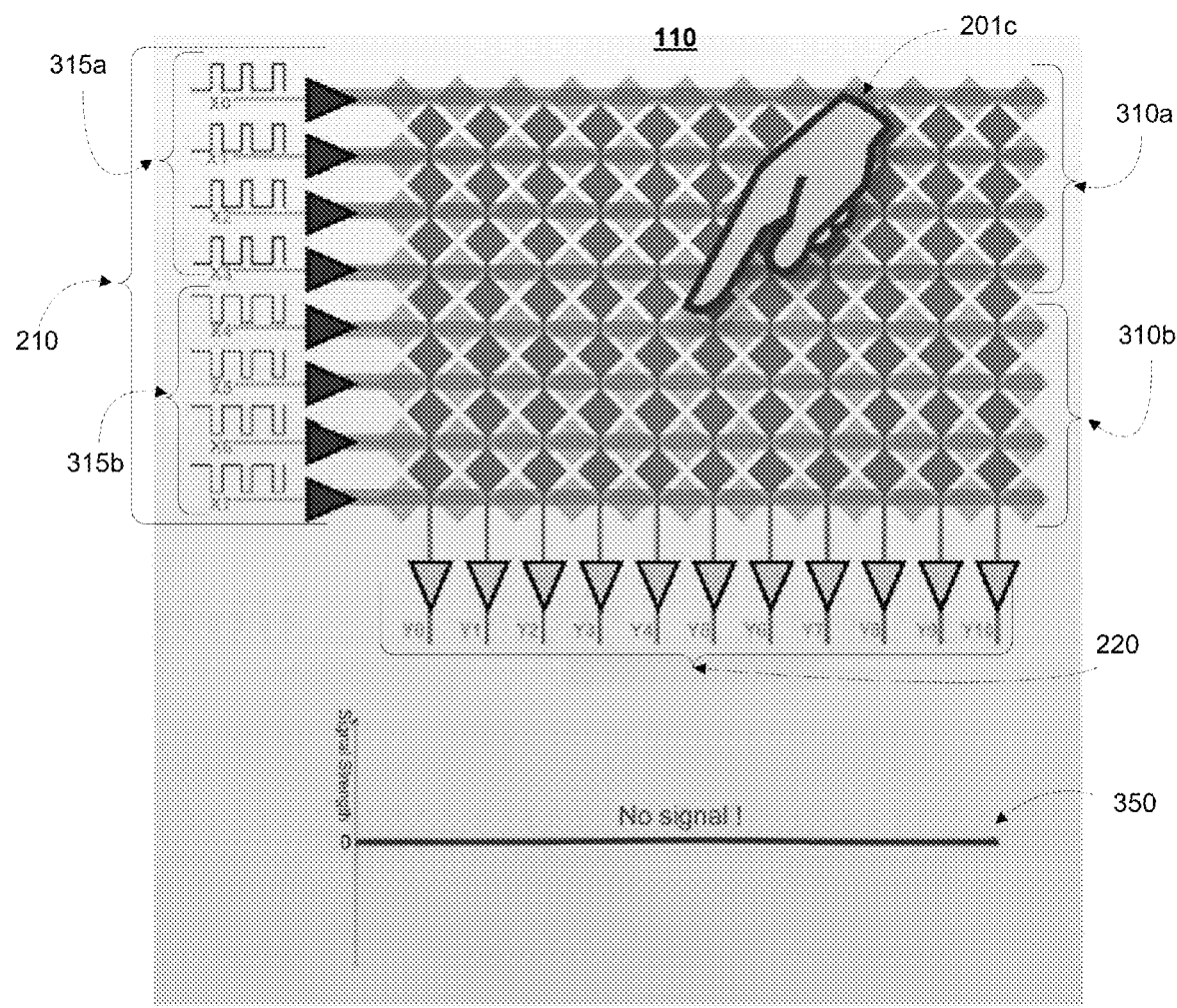
FIG. 3c illustrates the example touch sensor of FIGS. 3a and 3b wherein a touch occurs in the blind spot of the sensor, according to certain embodiments of the present disclosure.
Figure 4A:
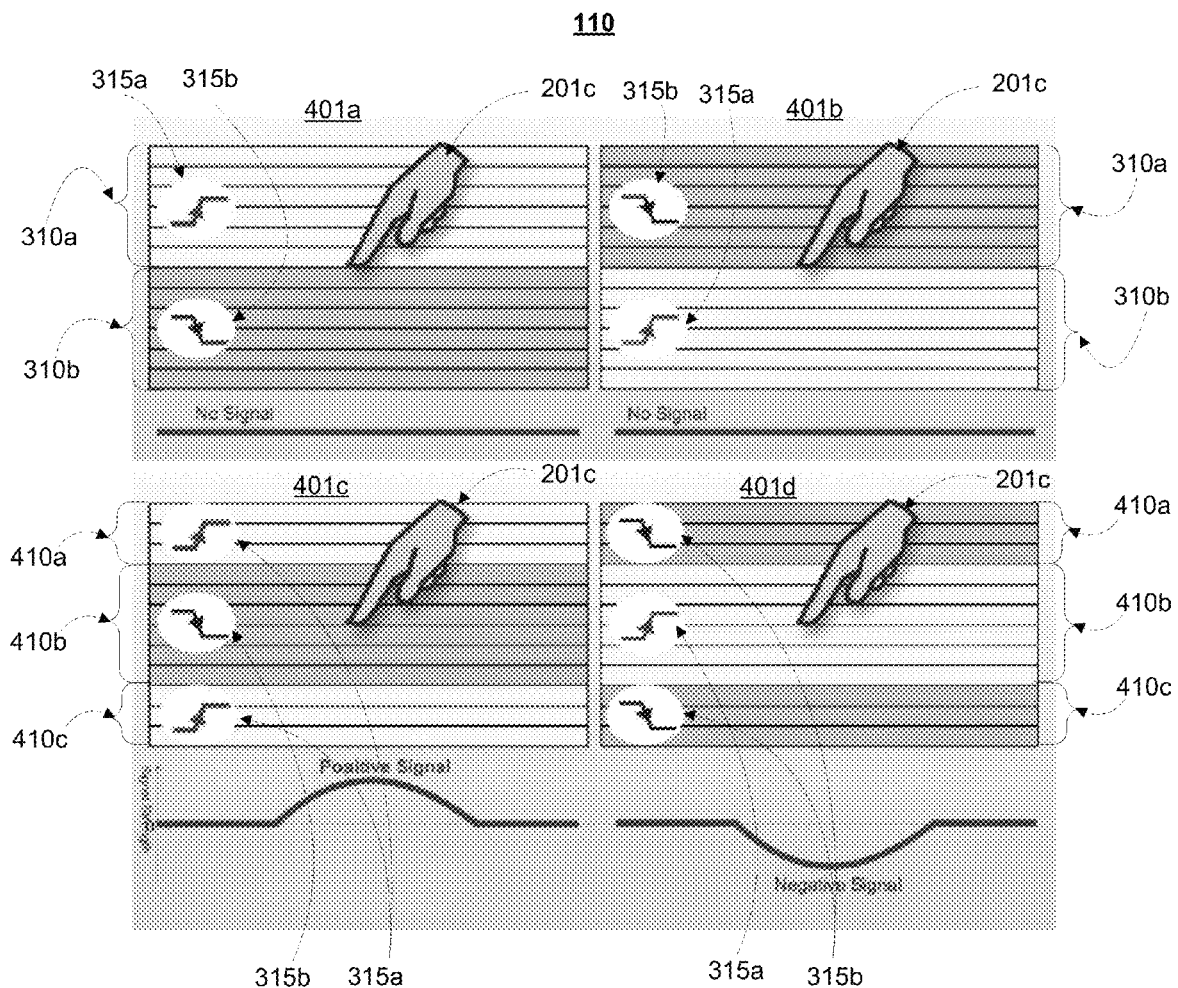
FIG. 4a illustrates an example touch sensor wherein all rows are pulsed simultaneously in such a way as to eliminate blind spots and a touch occurs in the blind spot of the touch sensor illustrated by FIGS. 3a, 3b, and 3c, according to certain embodiments of the present disclosure.
Figure 4B:
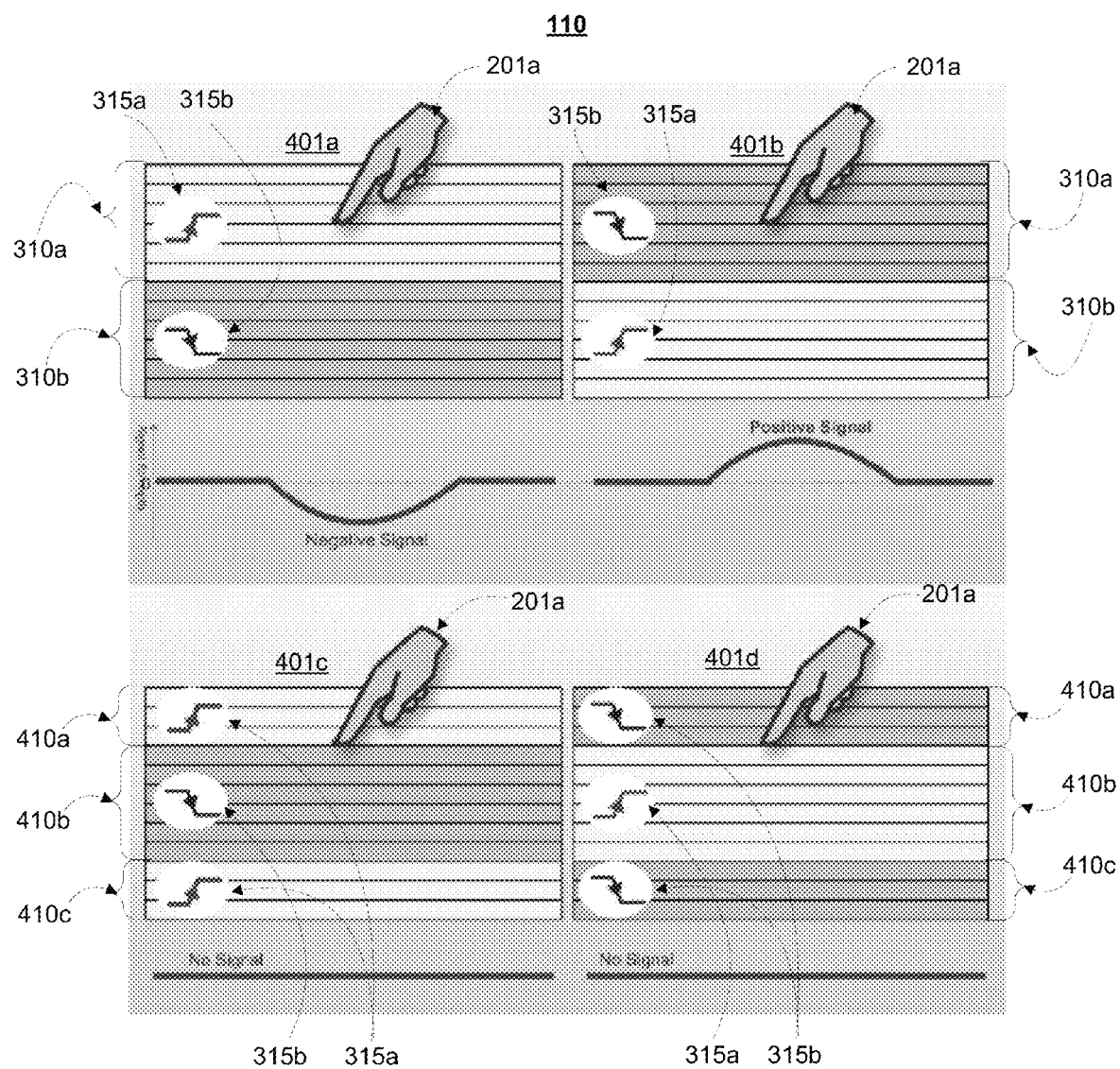
FIG. 4b illustrates the example touch sensor of FIG. 4a wherein a touch occurs in a different location that illustrated in FIG. 4a, according to certain embodiments of the present disclosure.
Figure 5:
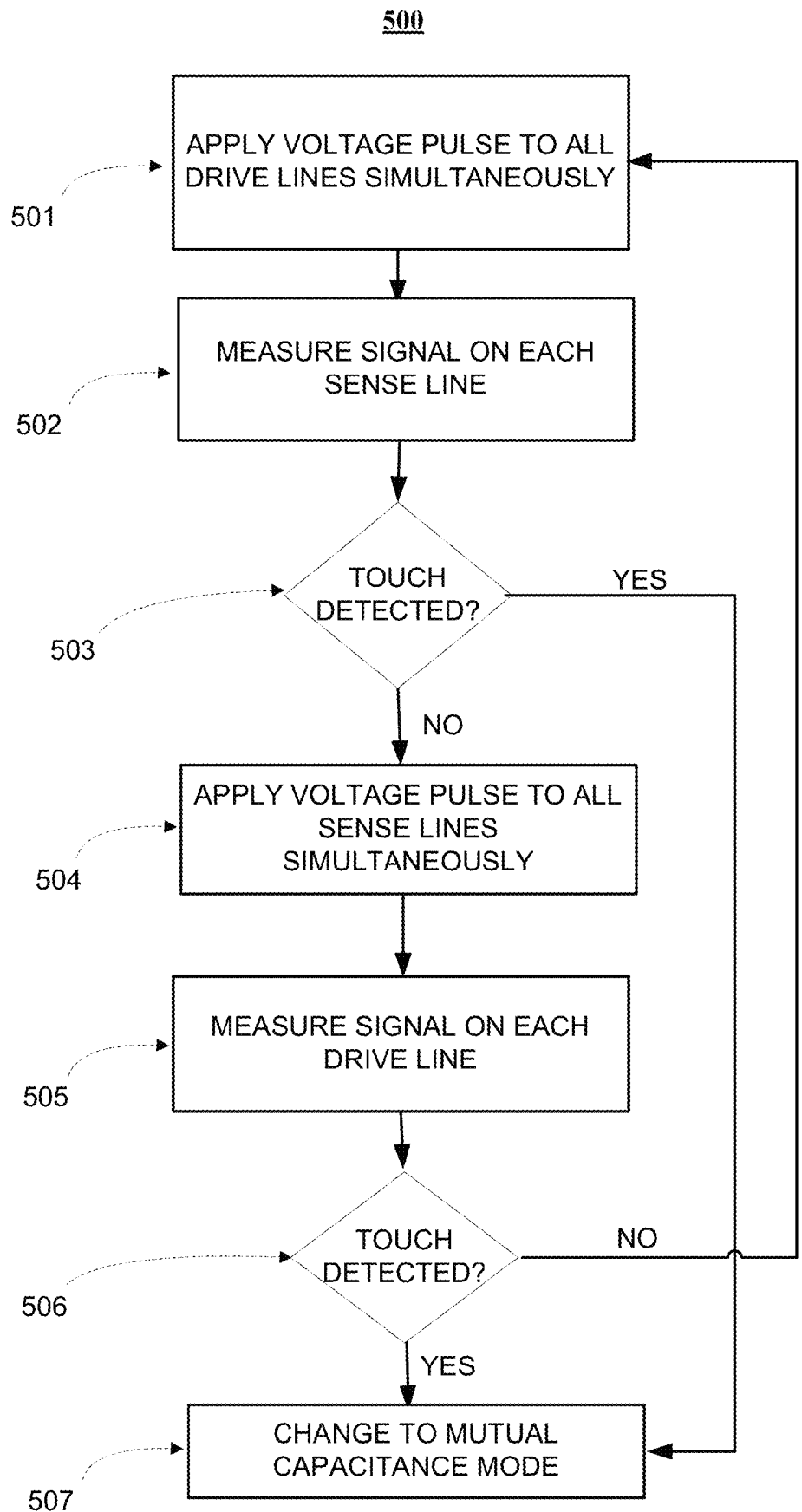
FIG. 5 is a flow chart illustrating an example method for detecting a touch by applying a pulse to all drive lines simultaneously, according to certain embodiments of the present disclosure.
Figure 6:
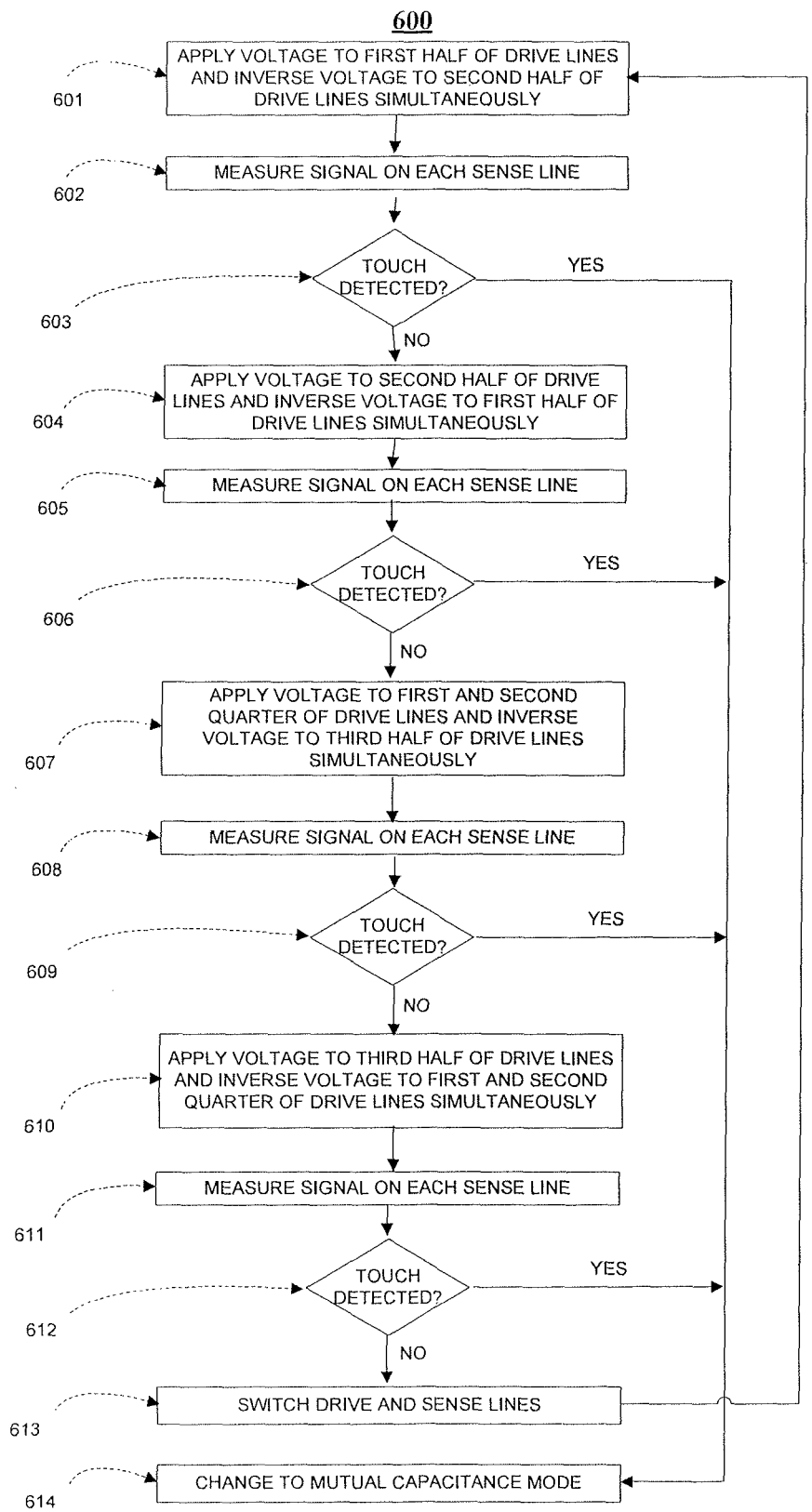
FIG. 6 is a flow chart illustrating an example method for detecting a touch by applying a pulse to all drive lines simultaneously in such a way as to reduce measured signal offset and eliminate blind spots, according to certain embodiments of the present disclosure.
Figure 7:
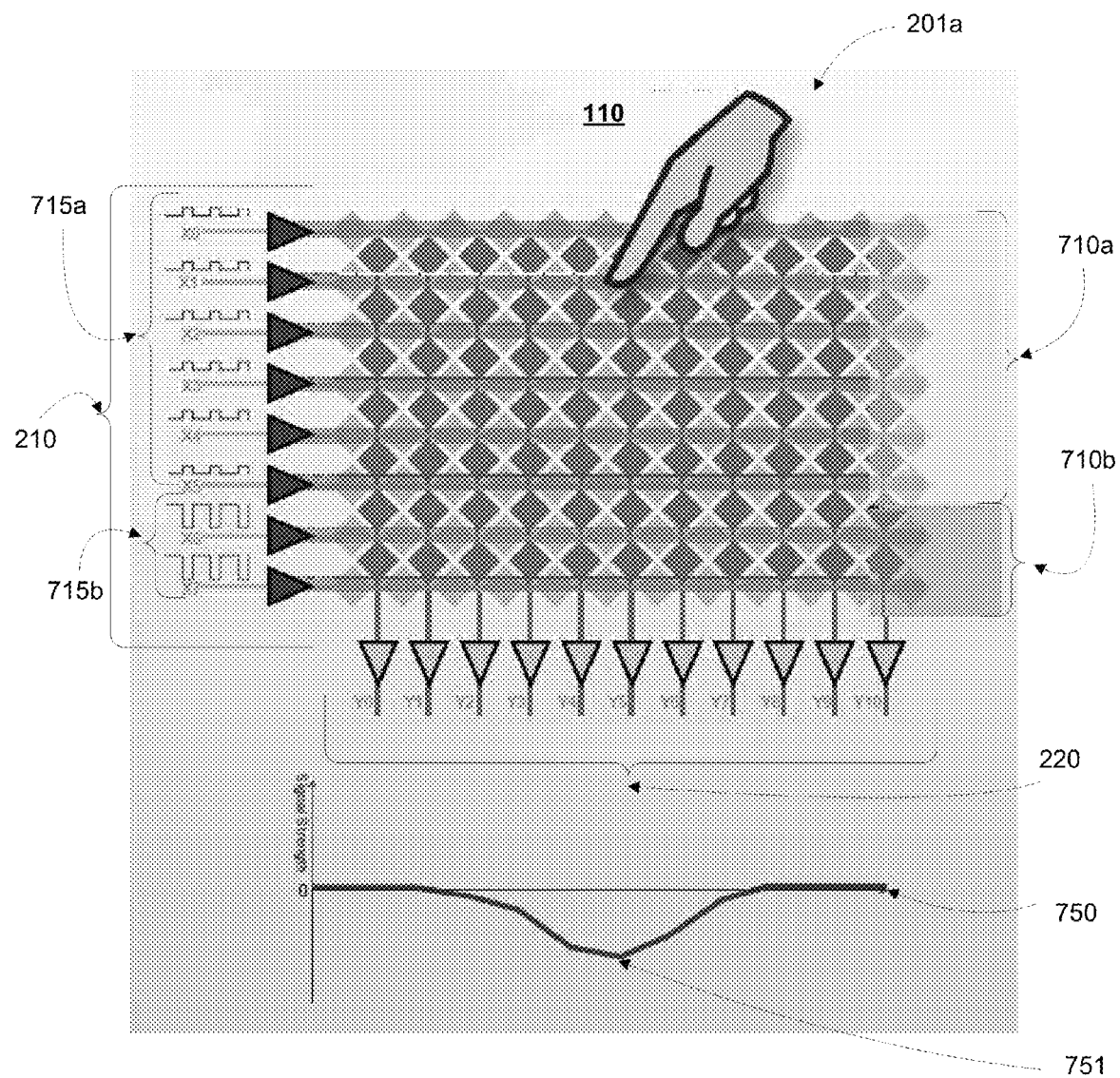
FIG. 7 illustrates an example touch sensor, showing operation of the touch sensor in an additional mode in which a touch sensor controller pulses all drive lines simultaneously in such a way as to reduce the measured signal offset, according to certain embodiments of the present disclosure.

FIG. 1 illustrates an example touch sensor with an example touch-sensor controller. FIGS. 2a and 2b illustrate an example touch sensor wherein all drive lines are pulsed simultaneously and all sense lines are measured simultaneously. FIGS. 3a, 3b, and 3c illustrate an example touch sensor wherein all drive lines are pulsed simultaneously in such a way as to reduce the measured signal offset. FIGS. 4a and 4b illustrate an example touch sensor wherein all drive lines are pulsed simultaneously in such a way as to eliminate blind spots. FIG. 5 is a flow chart illustrating an example method for detecting a touch by applying a pulse to all drive lines simultaneously. FIG. 6 is a flow chart illustrating an example method for detecting a touch by applying a pulse to all drive lines simultaneously in such a way as to reduce measured signal offset and eliminate blind spots. FIG. 7 illustrates an example touch sensor, showing operation of the touch sensor in an additional mode in which a touch sensor controller pulses all drive lines simultaneously in such a way as to reduce the measured signal offset.

FIG. 1 illustrates an example touch sensor 110 with an example touch-sensor controller 112, according to certain embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit 120, a drive unit 122, a sense unit 124, and a storage unit 126. Drive unit 122 may supply drive signals to the drive electrodes of touch sensor 110. Sense unit 124 may sense charge at the capacitive nodes of touch sensor 110 and provide measurement signals to processor unit 120 representing capacitances at the capacitive nodes. Processor unit 120 may control the supply of drive signals to the drive electrodes by drive unit 122 and process measurement signals from sense unit 124 to detect and process the presence and location of a touch or proximity input within the touch-sensitive area(s) of touch sensor 110. Processing measurement signals may include filtering, calculating gradients, and restructuring the measurement signals to more accurately represent the touch or proximity input. The processor unit may also track changes in the position of a touch or proximity input within the touch-sensitive area(s) of touch sensor 110. Storage unit 126 may store programming for execution by processor unit 120, including programming for controlling drive unit 122 to supply drive signals to the drive electrodes, programming for processing measurement signals from sense unit 124, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which drive unit 122 of touch-sensor controller 112 may supply drive signals to the drive electrodes. Other tracks 114 may provide sense connections for coupling touch-sensor controller 112 to sense electrodes of touch sensor 110, through which sense unit 124 of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 µm or less. As another example, the conductive material of tracks 114 may be silver or silver-based and have a width of approximately 100 µm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

FIG. 2a illustrates additional details of touch sensor 110, showing operation of touch sensor 110 in a mode in which all drive lines are pulsed simultaneously by touch sensor controller 112 and all sense lines are measured simultaneously by touch sensor controller 112. Illustrated in FIG. 2a are a plurality of rows 210 corresponding to drive lines as described above with respect to FIG. 1, a plurality of columns 220 corresponding to sense lines as described above with respect to FIG. 1, a touch 201, signals 250a, 251a, and 230a, and signal offset 240a. In this mode of operation, when a pulse of voltage is driven through rows 210 by touch sensor control 112, signals 250a may be measured at each of the columns 220 by touch sensor controller 112. The simultaneous pulse of voltage may not be driven though rows 210 at exactly the same moment, but results in the same charge being induced on each column 220 at the time signal 250a is measured, in particular embodiments. In the presence of a touch 201, the signal 251a that is measured at the column 220 where the touch 201 takes place will be different than the signals 250a that are measured at columns 220 where the touch does not take place. Additionally, in the presence of a touch, signals 250a that are measured where there is no touch may be different than the signals that are measured when there is no touch at all on touch sensor 110 (not illustrated). Therefore, touch sensor controller 112 may use the difference between the signals measured when there is a touch, both signal 251a and signals 250a, and the signals measured when there is no touch to detect touch 201. Touch sensor controller 112 may also use the difference between signal 251a measured in the presence of a touch and both signals 250a measured where there is no touch and the signals measured when there is no touch to detect touch 201, in particular embodiments. Signal 251a provides touch sensor controller 112 with an indication that a touch has taken place, and on which column 220 it has taken place. However, because all rows are pulsed simultaneously, touch sensor controller 112 may not be able to determine on what row touch 201 has occurred. Upon detecting a touch 201 on touch sensor 110, touch sensor controller 112 may change to a typical mutual capacitance mode of operation wherein each drive line is pulsed sequentially.

FIG. 2b illustrates additional details of touch sensor 110, showing touch sensor 110 in a mode of operation similar to that illustrated in FIG. 2a wherein the drive lines and sense lines are switched with each other. Illustrated in FIG. 2b are a plurality of rows 210 corresponding to sense lines, a plurality of columns 220 corresponding to drive lines, a touch 201, signals 250b, 251b, and 230b, and signal offset 240b. In this mode of operation, all columns 220 are pulsed simultaneously by touch sensor controller 112 and all rows 210 are measured simultaneously be touch sensor controller 112. Touch sensor controller 112 may be operable to alternate between delivering voltage pulses to rows 210, as illustrated in FIG. 2a, and columns, as illustrated in FIG. 2b, in particular embodiments. When a pulse of voltage is driven through columns 220 by touch sensor control 112, signals 250b may be measured at each of the rows 210 by touch sensor controller 112. In the presence of a touch 201 the signal 250b that is measured at the row 210 where the touch 201 takes place will be different than the signals 250b that are measured at rows 210 where the touch does not take place, as illustrated by signal 251b. Signal 251b provides touch sensor controller 112 with an indication of that a touch has taken place, and on which row 210 it has taken place. As discussed above with regard to FIG. 2A, touch sensor controller 112 may use the difference between the signals measured when there is a touch, both signal 251b and signals 250b, and the signals measured when there is no touch to detect touch 201. Touch sensor controller 112 may also use the difference between signal 251b measured in the presence of a touch and both signals 250b measured where there is no touch and the signals measured when there is no touch to detect touch 201, in particular embodiments.

The modes of operation illustrated in FIGS. 2a and 2b provide a faster response time and lower power consumption by touch sensor 110 and touch sensor controller 112 than a typical mutual capacitance mode of operation. Faster response time is provided because touch sensor controller only needs to make one measurement on the sense lines to determine if a touch has taken place when all drive lines are pulsed simultaneously, as opposed to measurements on the sense lines for each drive line that is pulsed sequentially in a typical mutual capacitance mode. Similarly, power consumption is reduced because touch sensor controller 112 may make fewer measurements in the modes of operation illustrated in FIGS. 2a and 2b than in a typical mutual capacitance mode of operation. For example if the measurements performed in both FIGS. 2a and 2b are performed, more power may be consumed by driving the drive lines than in a typical mutual capacitance mode, but less power may be consumed by measurements and calculations because only one measurement is taken on each sense line for the measurements illustrated in FIGS. 2a and 2b. As a result less total power may be consumed by the measurements and related calculations illustrated in FIGS. 2a and 2b than in a typical mutual capacitance mod of operation. However, simultaneously pulsing the drive lines as illustrated in FIGS. 2a and 2b may result in a signal offsets 240a and 240b between signals 250a and 250b and signals 230a and 230b, respectively, that would have resulted if each drive line was pulsed sequentially as in a typical mutual capacitance sensor. Signal offsets 240a and 240b may result in the measurement circuitry of touch sensor controller 112 becoming saturated by signals 250a and 250b in the absence of a touch 201. If touch sensor controller 112 becomes saturated in the absence of a touch, then touch sensor controller 112 may not be able to detect whether or not a touch 201 has occurred when there is a touch 201. Signal offset 240a may have a different magnitude than signal offset 240b. Signal offset depends on the stray mutual capacitance between a sense line and all of the driving lines, which in turn depends on the number of rows 210 and columns 220 present in touch sensor 110, in particular embodiments.

FIGS. 3a, 3b, and 3c illustrate additional details of touch sensor 110, showing operation of touch sensor 110 in a mode in which touch sensor controller 112 pulses all drive lines simultaneously in such a way as to reduce the measured signal offsets 240a and 240b. Illustrated in FIG. 3a are a plurality of rows 210 corresponding to drive lines, half 310a of rows 210, half 310b of rows 210, a plurality of columns 220 corresponding to sense lines, voltage 315a, inverse voltage 315b, touch 201a, and signals 350 and 351a. FIG. 3a shows operation of touch sensor 110 in a mode in which touch sensor controller 112 pulses half 310b of rows 210 with an inverse voltage 315b having magnitude approximately equal to, and a polarity opposite of, the voltage 315a pulsed through half 310a of rows 210. Half 310a and half 310b may each comprise approximately, but not exactly half of rows 210, in particular embodiments. For example if there are an odd number of rows 210 one of half 310a or 310b will have more rows than the other. Pulsing half 310a with voltage 315a and half 310b with inverse voltage 315b reduces or eliminates the signal offset 240a, as illustrated in FIG. 2a, that results if all rows 210 are pulsed with the same voltage. Additionally, if one of half 310a or 310b is contains more rows than the other half, better signal offset cancellation may occur, depending on the physical properties of the rows 210, in particular embodiments. Because of the reduction or elimination of signal offset 240a, the resulting signals 350 may not saturate touch sensor controller 112 in the absence of a touch. This enables touch sensor controller 112 to correctly measure the signal 351a on a the column 220 where touch 201a takes place. Signal 351a provides touch sensor controller 112 with an indication that a touch has taken place, and on which column 220 it has taken place.

As illustrated in FIG. 3a, touch 201a takes place in half 310a, resulting in a negative signal 351a on the column 220 where touch 201a takes place. FIG. 3b shows touch sensor 110 in the mode of operation illustrated in FIG. 3a, wherein a touch 201b takes place in half 310b. Because the pulse of inverse voltage 315b that touch sensor controller 112 applies to half 310b is the inverse of the pulse of voltage 315a that touch sensor controller 112 applies to half 310a, the signal 351b that touch sensor controller 112 measures at the column 220 where touch 201b takes place is the opposite of the signal 351a that touch sensor controller 112 measures when touch 201a takes place in half 310a. For example, in FIG. 3b signal 351a is positive whereas in FIG. 3a signal 351a is negative. Touch sensor controller 112 may only be able to detect a touch based on a negative signal, in particular embodiments. Alternatively, touch sensor controller 112 may only be able to detect a touch based on a positive signal, in particular embodiments. Detecting a touch based only on a positive or only on a negative signal may allow touch sensor controller 112 to better suppress thermal drifts or better detect a touch in the event that touch sensor 110 was calibrated incorrectly. Touch sensor controller 112 may also be able to detect a touch based on either a negative or a positive signal, in certain embodiments. In the case where touch sensor controller is only able to detect a touch based on one of a positive or a negative signal, touch sensor controller 112 may alternately pulse the inverse voltages between the halves 310a and 310b. For example, touch sensor controller 112 may deliver a pulse of voltage 315a to half 310a and a pulse of inverse voltage 315b to half 310b, followed by a pulse of inverse voltage 315b to half 310a and a pulse of voltage 315a to half 310b (not illustrated). This will cause a touch in either half of touch sensor 110 to produce both a positive signal 351b and a negative signal 351a in sequence, allowing touch sensor controller 112 to detect touch 201a or 201b. Additionally, touch sensor controller 112 may be operable to switch the drive and sense lines, similar to the mode of operation illustrated in FIG. 2b, so that inverse pulses are sent through half of columns 220 and a signal is measured on rows 210, in particular embodiments. Upon detecting a touch 201a or 201b on touch sensor 110, touch sensor controller 112 may change to a typical mutual capacitance mode of operation wherein each drive line is pulsed sequentially.

FIG. 3c shows touch sensor 110 in the mode of operation illustrated in FIGS. 3a and 3b, wherein a touch 201c takes place at the boundary between half 310a and half 310b. Because touch 201c takes place at the boundary between half 310a and half 310b, essentially half of touch 201c occurs in half 310a and half of touch 201 occurs in half 310b. Since touch sensor controller 112 drives half 310b with a pulse of inverse voltage 315b that is the inverse of the pulse of voltage 315a that touch sensor controller 112 drives through half 310a, the signal produced by the half of touch 201c occurring in half 310a and the signal produced by the half of touch 201c occurring in half 310b cancel each other out. As a result, touch sensor controller 112 measures no signal on the column where touch 201c takes place. In the illustrated example, touch sensor 110 has a blind spot at the boundary between half 310a and half 310b where a touch cannot be detected. An approach to address blind spots is described below in conjunction with FIGS. 4a and 4b.

FIGS. 4a and 4b illustrate additional details of touch sensor 110, showing operation of touch sensor 110 in a mode in which touch sensor controller 112 pulses all drive lines simultaneously in such a way as to eliminate blind spots that may occur as illustrated in FIG. 3c. The mode of operation of touch sensor controller 112 illustrated in FIGS. 4a and 4b is sufficient to detect a touch anywhere on the screen. As discussed below, depending on the location of the touch, and the measurement capabilities of touch sensor 112, certain patterns illustrated in FIGS. 4a and 4b may not be necessary to detect a touch.

Illustrated in FIG. 4a are half 310a corresponding to drive lines, half 310b corresponding to drive lines, quarter 410a corresponding to drive lines, quarter 410c corresponding to drive lines, half 410b corresponding to drive lines, voltage 315a, inverse voltage 315b, touch 201c, and pulse patterns 401a, 401b, 401c, and 401d. FIG. 4a shows operation of touch sensor 110 in a mode in which touch 201c occurs at the boundary between halves 310a and 310b and touch sensor controller 112 drives a sequence of pulse patterns through touch sensor 110. Pulse patterns 401a, 401b, 401c, and 401d illustrate the sequence of voltage pulses that touch sensor controller 112 drives through touch sensor 110. At pulse pattern 401a, touch sensor controller 112 drives a pulse of voltage 315a though half 310a and a pulse of inverse voltage 315b through half 310b. Because touch 201c occurs at the boundary between halves 310a and 310b, touch 201c does not produce a signal and touch sensor controller 112 does not detect touch 201c at pulse pattern 401a. At pulse pattern 401b, touch sensor controller 112 drives a pulse of inverse voltage 315b though half 310a and a pulse of voltage 315a through half 310b. Because touch 201c occurs at the boundary between halves 310a and 310b, touch 201c does not produce a signal and touch sensor controller 112 does not detect touch 201c at pulse pattern 401b. At pulse pattern 401c, touch sensor controller 112 drives a pulse of voltage 315a through quarters 410a and 410c and a pulse of inverse voltage 315b through half 410b. Because touch 201c occurs within half 410b, touch 201c produces a signal and touch sensor controller 112 may be able to detect touch 201c at pulse pattern 401c. At pulse pattern 401d, touch sensor controller 112 drives a pulse of inverse voltage 315b through quarters 410a and 410c and a pulse of voltage 315a through half 410b. Because touch 201c occurs within half 410b, touch 201c produces a signal and touch sensor controller 112 may be able to detect touch 201c at pulse pattern 401d.

FIG. 4b shows operation of touch sensor 110 in a mode in which touch sensor controller 112 drives the same sequence of pulse patterns as illustrated in FIG. 4a through touch sensor 110 and touch 201a occurs on the boundary between quarter 410a and half 410b. At pulse pattern 401a, touch sensor controller 112 drives a pulse of voltage 315a though half 310a and a pulse of inverse voltage 315b through half 310b. Because touch 201a occurs within half 310a, touch 201a produces a signal and touch sensor controller 112 may be able to detect touch 201a at pulse pattern 401a. At pulse pattern 401b, touch sensor controller 112 drives a pulse of inverse voltage 315b though half 310a and a pulse of voltage 315a through half 310b. Because touch 201a occurs within half 310a, touch 201a produces a signal and touch sensor controller 112 may be able to detect touch 201a at pulse pattern 401b. At pulse pattern 401c, touch sensor controller 112 drives a pulse of voltage 315a through quarters 410a and 410c and a pulse of inverse voltage 315b through half 410b. Because touch 201a occurs at the boundary between quarter 410a and half 410b, touch 201 does not produce a signal and touch sensor controller 112 may not detect touch 201a at pulse pattern 401c. At pulse pattern 401d, touch sensor controller 112 drives a pulse of inverse voltage 315b through quartiles 410a and 410c and a pulse of voltage 315a through half 410b. Because touch 201a occurs at the boundary between quarter 410a and half 410b, touch 201a does not produce a signal and touch sensor controller 112 may not detect touch 201a at pulse pattern 401d.

Touch sensor controller 112 may be operable to detect only positive or only negative signals produced by a touch, in particular embodiments. For example, touch sensor controller 112 may be operable to detect only positive signals produced by a touch. In this case, touch sensor controller 112 may only be able to detect touch 201a during pulse pattern 401b and touch 201c during pulse pattern 401c. Alternatively, touch sensor controller 112 may be operable to detect only negative signals produced by a touch. In this case, touch sensor controller 112 may only be able to detect touch 201a during pulse pattern 401a and touch 201c during pulse pattern 401d. By moving through pulse patterns 401a, 401b, 401c, and 401d sequentially a touch at any location may produce signals that touch sensor controller 112 may be able to detect. Upon detecting a touch on touch sensor 110, touch sensor controller 112 may change to a typical mutual capacitance mode of operation wherein each drive line is pulsed sequentially.

Touch sensor controller 112 also may be operable to detect both positive and negative signals produced by a touch, in particular embodiments. In this case, touch sensor controller 112 may be able to detect touch 201a during pulse patterns 401a and 401b and touch 201c during pulse patterns 401c and 401d. Touch sensor controller 112 may only require two pulse patterns to guarantee detection of a touch in this mode of operation. For example, pulse patterns 401a and 401c, or 401a and 401d, or 401b and 401c, or 401b and 401d would be sufficient to detect any touch if touch sensor controller 112 is able to detect both a positive and negative signals produced by a touch.

Additionally, touch sensor controller 112 may be operable to switch the drive and sense lines of touch sensor 110. For example, touch sensor controller may be operable apply pulse patterns 401a, 401b, 401c and 401d to the rows of touch sensor 110 while measuring signals on columns of touch sensor 110 as illustrated in FIGS. 4a and 4b, and then apply pulse patterns 401a, 401b, 401c and 401d to columns of touch sensor 110 while measuring signals on the rows of touch sensor 110. This mode of operation may allow touch sensor controller 112 to determine on which column and on which row a touch has occurred.

FIG. 5 is a flow chart illustrating an example method 500 for detecting a touch by applying a pulse of voltage to all drive lines simultaneously. Method 500 begins at step 501 where touch sensor controller 112 applies a voltage pulse simultaneously to all drive lines in touch sensor 110. For example, the drive lines may be the rows of touch sensor 110 as illustrated in FIG. 2a. At step 502, touch sensor controller 112 measures the signals on all sense lines. For example, touch sensor controller 112 may measure the signal on each of the columns of touch sensor 110 as illustrated in FIG. 2a. In the presence of a touch, the signal that touch sensor controller 112 measures on the sense line where the touch occurred will differ from the signals touch sensor controller 112 measures on the sense lines where the touch did not occur. At step 503, touch sensor controller 112 determines if a touch has occurred based on the signals it measured at a step 502. If touch sensor 112 detects a touch, touch sensor controller 112 switches to mutual capacitance mode, wherein each drive line is pulsed sequentially, at step 507, and method 500 ends. If touch sensor 112 does not detect a touch, method 500 proceeds to step 504.

At step 504, touch sensor controller 112 applies a pulse of voltage simultaneously to the lines that acted as sense lines during steps 501 and 502. For example, touch sensor controller 112 may apply a pulse of voltage simultaneously to the columns of touch sensor 110 as illustrated in FIG. 2b. At step 505, touch sensor controller 112 measures the signals on all lines that acted as drive lines during steps 501 and 502. For example, touch sensor controller 112 may measure the signal on each of the rows of touch sensor 110 as illustrated in FIG. 2b. At step 506, touch sensor controller 112 determines if a touch has occurred based on the signals it measured at a step 505. If touch sensor 112 detects a touch, touch sensor controller 112 switches to mutual capacitance mode, wherein each drive line is pulsed sequentially, at step 507, and method 500 ends. If touch sensor 112 does not detect a touch, method 500 returns to step 501.

FIG. 6 is a flow chart illustrating an example method 600 for detecting a touch by applying a pulse to all drive lines simultaneously in such a way as to reduce measured signal offset and eliminate blind spots. Method 600 begins at step 601 where touch sensor controller 112 applies a pulse of voltage simultaneously to half of the drive lines in touch sensor 110 while at the same time applying an inverse pulse of voltage to the other half of the drive lines in touch sensor 110. For example, touch sensor controller 112 may apply pulse pattern 401a to the drive lines as illustrated in FIGS. 4a and 4b. At step 602, touch sensor controller 112 measures the signals on all sense lines. At step 603, touch sensor controller 112 determines if a touch has occurred based on the signals it measured at a step 602. If touch sensor 112 detects a touch, touch sensor controller 112 switches to mutual capacitance mode, wherein each drive line is pulsed sequentially, at step 614, and method 600 ends. If touch sensor 112 does not detect a touch, method 600 proceeds to step 604.

At step 604, touch sensor 112 applies the inverse voltage pulse to the half of drive lines that received the voltage pulse in step 601, and applies the voltage pulse to the half of drive lines that received the inverse voltage pulse in step 601. For example, touch sensor controller 112 may apply pulse pattern 401b to the drive lines as illustrated in FIGS. 4a and 4b. At step 605, touch sensor controller 112 measures the signals on all sense lines. At step 606, touch sensor controller 112 determines if a touch has occurred based on the signals it measured at a step 605. If touch sensor 112 detects a touch, touch sensor controller 112 switches to mutual capacitance mode, wherein each drive line is pulsed sequentially, at step 614, and method 600 ends. If touch sensor 112 does not detect a touch, method 600 proceeds to step 607.

At step 607, touch sensor controller 112 applies a voltage pulse to two quarters of the drive lines that are separated by half of the drive lines of touch sensor 110, and applies an inverse voltage pulse to the half of the drive lines separating the two quarters of drive lines. For example, touch sensor controller 112 may apply pulse pattern 401c to the drive lines as illustrated in FIGS. 4a and 4b. At step 608, touch sensor controller 112 measures the signals on all sense lines. At step 609, touch sensor controller 112 determines if a touch has occurred based on the signals it measured at a step 608. If touch sensor 112 detects a touch, touch sensor controller 112 switches to mutual capacitance mode, wherein each drive line is pulsed sequentially, at step 614, and method 600 ends. If touch sensor 112 does not detect a touch, method 600 proceeds to step 610.

At step 610, touch sensor controller 112 applies the inverse voltage pulse to the two quarters of the drive lines that received the voltage pulse in step 607, and applies the voltage pulse to the half of the drive lines that received the inverse voltage pulse in step 607. For example, touch sensor controller 112 may apply pulse pattern 401d to the drive lines as illustrated in FIGS. 4a and 4b. At step 611, touch sensor controller 112 measures the signals on all sense lines. At step 612, touch sensor controller 112 determines if a touch has occurred based on the signals measured at a step 611. If touch sensor 112 detects a touch, touch sensor controller 112 switches to mutual capacitance mode, wherein each drive line is pulsed sequentially, at step 614, and method 600 ends. If touch sensor 112 does not detect a touch, method 600 proceeds to step 613.

At step 613, touch sensor controller 112 switches the drive and sense lines, so that the lines which acted as sense lines during steps 601-612 become drive lines and the lines which acted as drive lines during steps 601-612 become sense lines. Method 600 then returns to step 601.

Although this disclosure describes and illustrates particular steps of the methods of FIGS. 5 and 6 as occurring in a particular order, this disclosure contemplates any suitable steps of the methods of FIGS. 5 and 6 occurring in any suitable order. Moreover, although this disclosure describes and illustrates particular components, devices, or systems carrying out particular steps of the methods of FIGS. 5 and 6, this disclosure contemplates any suitable combination of any suitable components, devices, or systems carrying out any suitable steps of the methods of FIGS. 5 and 6.

FIG. 7 illustrates additional details of touch sensor 110, showing operation of touch sensor 110 in an additional mode in which touch sensor controller 112 pulses all drive lines simultaneously in such a way as to reduce the measured signal offsets 240a and 240b. Illustrated in FIG. 7 are a plurality of rows 210 corresponding to drive lines, portion 710a of rows 210, portion 710b of rows 210, a plurality of columns 220 corresponding to sense lines, voltage 715a, inverse voltage 715b, touch 201a, and signals 750 and 751. Portions 710a and 710b together contain all of rows 210, but individually may be any fraction of the rows 210. For example, portion 710a contains approximately three-quarters of rows 210 and portion 710b contains approximately one-quarter of rows 210, in the illustrated embodiment. FIG. 7a shows operation of touch sensor 110 in a mode in which touch sensor controller 112 pulses portion 710b of rows 210 with an inverse voltage 715b having magnitude inversely proportional to the number of rows 210 in portion 710b, and a polarity opposite of the voltage 715a pulsed through portion 710a of rows 210. Voltage 715a has a magnitude inversely proportional to the number of rows 210 in portion 710a. For example, inverse voltage 715b has a magnitude three times that of voltage 715a because portion 710b contains one-third of the number of rows 210 contained in portion 710a, in the illustrated embodiment. Pulsing portion 310a with voltage 715a and portion 710b with inverse voltage 715b reduces or eliminates the signal offset 240a, as illustrated in FIG. 2a, that results if all rows 210 are pulsed with the same voltage. Because of the reduction or elimination of signal offset 240a, the resulting signals 750 may not saturate touch sensor controller 112 in the absence of a touch. This enables touch sensor controller 112 to correctly measure the signal 751 on a the column 220 where touch 201a takes place. Voltage 715a may have a magnitude that is not inversely proportional to the number of rows in portion 710a and inverse voltage 715b may have a magnitude that is not inversely proportional to the number of rows in portion 710b, in an certain embodiments. For example, the magnitudes of voltage 715a and inverse voltage 715b could be tuned to produce a certain amount of signal offset in signals 750, if desired. Signal 751 provides touch sensor controller 112 with an indication that a touch has taken place, and on which column 220 it has taken place.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus for detecting a touch comprising:
   a touch sensor comprising a first plurality of electrode lines and a second plurality of electrode lines; and
   a touch sensor controller coupled to the touch sensor, the touch sensor controller operable to:
     in a first detecting mode, perform operations comprising:
       applying a respective voltage pulse simultaneously to each of the first plurality of electrode lines;
       measuring a respective signal at each of the second plurality of electrode lines; and
     change, in response to not detecting a touch in the first detecting mode, to a second detecting mode, the touch sensing controller operable to, in the second detecting mode, perform operations comprising:
       applying a respective voltage pulse simultaneously to each of the second plurality of electrode lines;
       measuring a respective signal at each of the first plurality of electrode lines; and
       detecting a touch based on the measurement of the respective signals.

2. The apparatus of claim 1, wherein the touch sensor controller is further operable to apply a respective voltage pulse simultaneously to each of the plurality of drive lines by applying:
   a respective voltage pulse having a first magnitude to a first portion of the first plurality of electrode lines; and
   a respective voltage pulse having a second magnitude and a polarity opposite the respective voltage pulse applied to the first portion of the first plurality of electrode lines to a second portion of the first plurality of electrode lines.

3. The apparatus of claim 2, wherein the first portion of the first plurality of electrode lines comprises a third portion of the first plurality of electrode lines and a forth portion of the first plurality of electrode lines, wherein the third portion of the first plurality of electrode lines is separated from a fourth portion of the first plurality of electrode lines by the second portion of the first plurality of electrode lines.

4. The apparatus of claim 2, wherein the touch sensor controller is further operable to detect a touch based on either positive or negative signals.

5. The apparatus of claim 1, wherein the touch sensor controller is further operable to apply a respective voltage pulse simultaneously to each of the plurality of drive lines by applying:
   a respective voltage pulse having a first magnitude to a first portion of the first plurality of electrode lines, wherein the first magnitude is inversely proportional to the first portion of the first plurality of electrode lines; and
   a respective voltage pulse having a second magnitude and a polarity opposite the respective voltage pulse applied to the first portion of the first plurality of electrode lines to a second portion of the first plurality of electrode lines, wherein the second magnitude is inversely proportional to the second portion of the first plurality of electrode lines.

6. The apparatus of claim 1, wherein the touch sensor controller is further operable to apply a respective voltage pulse to each of the first plurality of electrode lines in a sequence when a touch has been detected.

7. A method comprising:
   in a first detecting mode, performing operations comprising:
     applying a respective voltage pulse simultaneously to each of a first plurality of electrode lines;
     measuring a respective signal at each of a second plurality of electrode lines; and
   changing, in response to not detecting a touch in the first detecting mode, to a second detecting mode;
   in the second detecting mode, performing operations comprising:
     applying a respective voltage pulse simultaneously to each of the second first plurality of electrode lines;
     measuring a respective signal at each of the first plurality of electrode lines; and
     detecting a touch based on the measurement of the respective signals.

8. The method of claim 7, further comprising:
   applying a respective voltage pulse having a first magnitude to a first portion of the first plurality of electrode lines; and
   applying a respective voltage pulse having a second magnitude and a polarity opposite the respective voltage pulse applied to the first portion of the first plurality of electrode lines to a second portion of the first plurality of electrode lines.

9. The method of claim 8, wherein the first portion of the first plurality of electrode lines comprises a third portion of the first plurality of electrode lines and a fourth portion of the first plurality of electrode lines, wherein the third portion of the first plurality of electrode lines is separated from a fourth portion of the first plurality of electrode lines by the second portion of the first plurality of electrode lines.

10. The method of claim 7, further comprising detecting a touch based on either positive or negative signals.

11. The method of claim 7, further comprising:
   applying a respective voltage pulse having a first magnitude to a first portion of the first plurality of electrode lines, wherein the first magnitude is inversely proportional to the first portion of the first plurality of electrode lines; and
   applying a respective voltage pulse having a second magnitude and a polarity opposite the respective voltage pulse applied to the first portion of the first plurality of electrode lines to a second portion of the first plurality of electrode lines, wherein the second magnitude is inversely proportional to the second portion of the first plurality of electrode lines.

12. The method of claim 7, further comprising applying a respective voltage pulse to each of the first plurality of electrode lines in a sequence when a touch has been detected.

13. A non-transitory computer readable medium comprising logic for execution, the logic, when executed by a processor, operable to:
  in a first detecting mode, perform operations comprising:
    causing the application of a respective voltage pulse simultaneously to each of a first plurality of electrode lines; and
    measuring a respective signal at each of a second plurality of electrode lines; and
  change, in response to not detecting a touch in the first detecting mode, to a second detecting mode, the logic, when executed by a processor, operable to, in the second detecting mode, perform operations comprising:
    causing the application of a respective voltage pulse simultaneously to each of the second plurality of electrode lines;
    measuring a respective signal at each of the first plurality of electrode lines; and
    detecting a touch based on the measurement of the respective signals.

14. The non-transitory computer readable medium comprising logic for execution of claim 13, the logic, when executed by a processor, further operable to cause the application of a respective voltage pulse simultaneously to each of the first plurality of electrode lines by causing the application of:
  a respective voltage pulse having a first magnitude to a first portion of the first plurality of electrode lines; and
  a respective voltage pulse having a second magnitude and a polarity opposite the respective voltage pulse applied to the first portion of the first plurality of electrode lines to a second portion of the first plurality of electrode lines.

15. The non-transitory computer readable medium comprising logic for execution of claim 14 wherein the first portion of the first plurality of electrode lines comprises a third portion of the first plurality of electrode lines and a fourth portion of the first plurality of electrode lines, wherein the third portion of the first plurality of electrode lines is separated from the fourth portion of the first plurality of electrode lines by the second portion of the first plurality of electrode lines.

16. The non-transitory computer readable medium comprising logic for execution of claim 14, the logic, when executed by a processor, further operable to detect a touch based on either positive or negative signals.

17. The non-transitory computer readable medium comprising logic for execution of claim 13, the logic, when executed by a processor, further operable to cause the application of a respective voltage pulse simultaneously to each of the first plurality of electrode lines by causing the application of:
  a respective voltage pulse having a first magnitude to a first portion of the first plurality of electrode lines, wherein the first magnitude is inversely proportional to the first portion of the first plurality of electrode lines; and
  a respective voltage pulse having a second magnitude and a polarity opposite the respective voltage pulse applied to the first portion of the first plurality of electrode lines to a second portion of the first plurality of electrode lines, wherein the second magnitude is inversely proportional to the second portion of the first plurality of electrode lines.

18. The non-transitory computer readable medium comprising logic for execution of claim 13, the logic, when executed by a processor, further operable to apply a respective voltage pulse to each of the first plurality of electrode lines in a sequence when a touch has been detected.

* * * * *

UNITED STATES PATENT AND TRADEMARK OFFICE
CERTIFICATE OF CORRECTION

PATENT NO. : 9,274,656 B2  
APPLICATION NO. : 13/929307  
DATED : March 1, 2016  
INVENTOR(S) : Samuel Brunet et al.

Page 1 of 1

It is certified that error appears in the above-identified patent and that said Letters Patent is hereby corrected as shown below:

In The Claims

Col. 16, Ln. 35: After "second" and before "plurality" delete "first".

Signed and Sealed this
Nineteenth Day of July, 2016

Michelle K. Lee
*Director of the United States Patent and Trademark Office*